Jan. 18, 1944. A. OLSON 2,339,509
SAW GAUGE
Filed Sept. 2, 1942

INVENTOR
ANDREW OLSON
BY
Cook & Robinson
ATTORNEY

Patented Jan. 18, 1944

2,339,509

UNITED STATES PATENT OFFICE 2,339,509

SAW GAUGE

Andrew Olson, Bangor, Wash.

Application September 2, 1942, Serial No. 457,102

5 Claims. (Cl. 76—31)

This invention relates to saw filing gauges, and has for its principal object to provide an improved form of gauge for use in filing the teeth of chain saws.

Explanatory to the present invention, it will here be stated that a saw of that kind for which the present gauge is designed for use, is made up in the form of a continuous belt, and comprises a succession of pivotally joined links. These links, for the most part, form the teeth of the saw and those particular teeth which constitute a central, longitudinal line of links, are each equipped with guide lugs extending from their base edges, which are adapted for travel in grooves formed in the longitudinal edges of a rigid saw blade as a means for functionally guiding the chain saw in making a cut. The teeth of the chain which comprise the central, longitudinal line of links, have adjacent ends joined in the chain by opposite side links, which links, for the most part, are equipped with teeth.

It is to be understood that the saw chain may embody therein links and teeth of various designs.

In the chain saw for which the present gauge is especially designed, the central line of links are equipped with teeth, all presumed to be of one length; that is, all are intended to extend equally beyond the saw blade edge. The outside links of the chain are equipped with teeth of the same length and these are slightly shorter than those of the teeth of the center line of links in the chain.

In the sharpening and gauging of the saw teeth, it is quite desirable that all teeth of each group be exactly of the same length. Therefore, it is required that all long teeth of each group be filed down to the length of the shorter ones of the respective groups.

In view of the foregoing, it has been the object of this invention to provide a gauge that is equipped for use in gauging and determining the lengths of the teeth of each of the two length groups.

More specifically stated, the present invention resides in the provision of a gauge to be used in combination with a chain saw holding clamp for the filing of teeth whereby all teeth in each length group may be brought to a uniform length.

Another object of the invention resides in the provision of a gauge wherein means is embodied for effecting adjustment of the tooth filing tool as required to best suit the teeth of the particular saw being worked on.

Still further objects of the invention reside in the details of construction and combination of the various parts and in their relationship and mode of use, as will hereinafter be fully described.

In accomplishing these and other objects of the invention, I have provided the improved details of construction, the preferred forms of which are illustrated in the accompanying drawing wherein—

Figure 1:
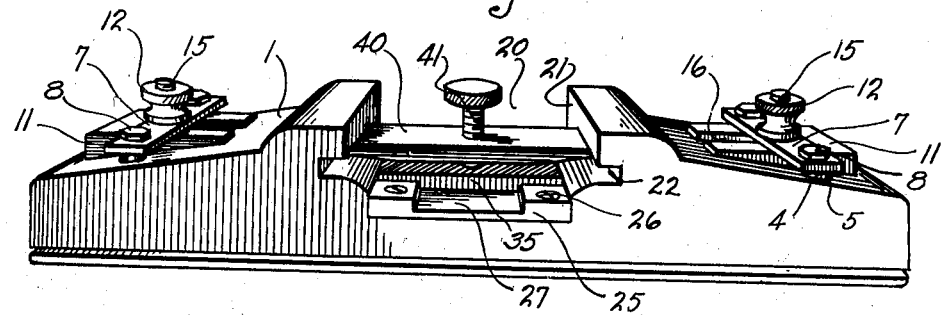
Fig. 1 is a perspective view of a saw gauge embodied by the present invention.

Referring more in detail to the drawing—

The gauge in its present preferred form of construction, comprises an elongated body block 1, of wood, metal or other material of suitable kind, and of rectangular cross section. This block is formed in its flat under surface, as noted in Figs. 2 and 3, with a longitudinal, downwardly opening channel 2. This is open at its ends to the ends of the block and is also of substantial width. Disposed in the channel 2, in spaced, parallel planes, are the side flanges 3a and 3b of angle bars 3 and 3' which bars, respectively, have base flanges 3c and 3d underlying the base surfaces of the body bar along opposite sides of the channel 2.

The angle bars 3 and 3' are each supported from near their opposite ends by vertical bolts or studs 4 which are fixed rigidly in the base flanges of the bars and extend upwardly and slidably through holes 5 in the block ends, and continue thereabove through holes 6 in the opposite ends of cross bars 7. At their upper ends, the studs 4 have nuts 8 fixed thereon which engage the bars to limit the downward adjustment of the angle bars.

Figure 3:
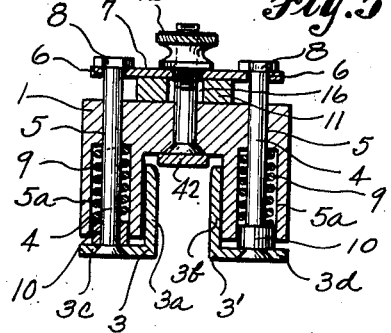
Fig. 3 is a cross section on the line 3—3 in Fig. 2.

Contained in lower end enlargements 5a of the holes 5, and about the studs 4 as seen in Fig. 3, are coiled springs 9. Each spring bears at its upper end against the base of the enlargement in which it is contained, and downwardly at its lower end against a bushing or collar 10 applied about the guide stud and which fits slidably in the lower end of the hole 5a and bears against the base flange of the angle bar. These springs 9 operate yieldingly to urge the angle bars 3—3' downwardly to the extent permitted by the cross bars 7.

Figure 2:
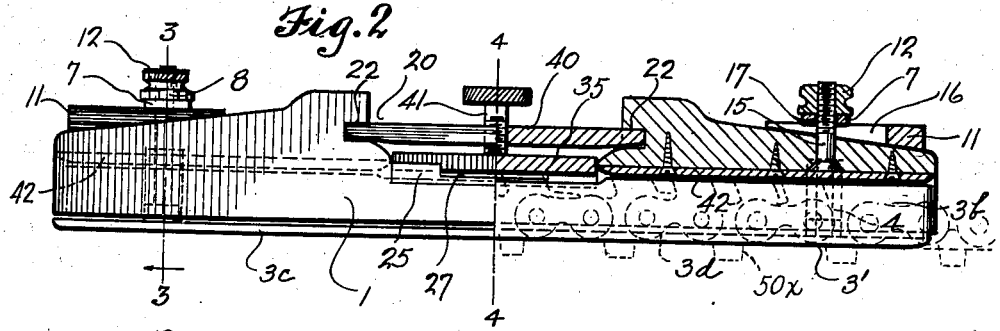
Fig. 2 is a view in side elevation and partially in vertical section, in the central longitudinal plane of the gauge and indicating the application of the gauge to the teeth of a saw.

Disposed beneath each cross bar 7, and slidably against the adjacent top surface of the block, is a wedge block 11. These wedge blocks are adapted to be adjusted to more or less extend beneath the bar 7 and lengthwise of the block, for the purpose of adjusting, determining or varying the spacing of the base flanges of the angle bars relative to the bottom surface of the block 1, thus to give the longitudinal channel 2 a more or less effective depth. Any adjustment may be fixed after it has been made, by the tightening of a clamp nut 12 downwardly against the bar and the latter against its underlying wedge block. As seen in Figs. 2 and 3, the clamp nuts 12 are threaded on anchor bolts 15 which are fixed at their lower ends in the block and extend upwardly through longitudinal slots 16 in the wedge blocks and through openings 17 in the cross bars 7 and are threaded to mount the nuts 12 thereon.

At a location intermediate its opposite ends, the body block 1 is cut away to provide a relatively wide transverse channel 20, which is formed to such depth that it passes through the base of the longitudinal channel 2. In the opposite side surfaces 21—21 of this cross channel are horizontal grooves 22—22, facing each other and with ends open to one side of the block and closed at their other ends as at 23 in Fig. 5. Somewhat below the level of the grooves 22—22, and disposed along the opposite sides of the open portion of the longitudinal groove 2, are flat, metal gauge bars 25—25, fixed to the block 1 by screws 26 through their end portions. These bars extend lengthwise of the block and both lie in the same horizontal plane, and each has its central portion cut down to a flat surface, designated at 27 in Fig. 5, which surfaces likewise are in the same horizontal plane.

Figure 4:
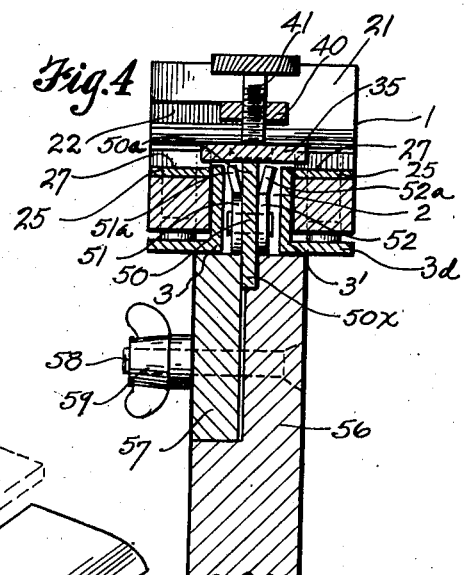
Fig. 4 is a cross section on line 4—4 in Fig. 2, showing the manner of holding a chain saw in a filing clamp, and the manner of applying the gauge to the saw for evening the longer teeth.
Figure 5:
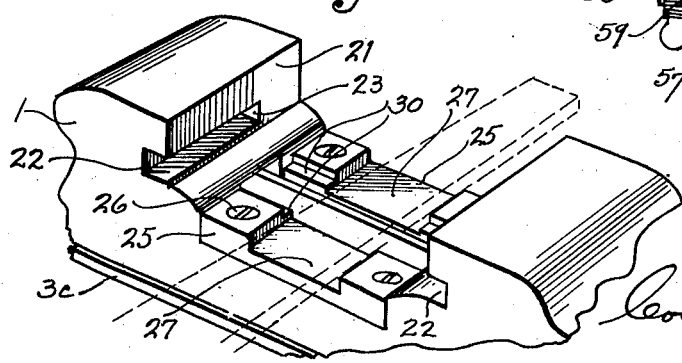
Fig. 5 is an enlarged perspective view of a part of the gauge, showing the clamp bar and the filing bar removed therefrom to adapt the device for the filing of the shorter teeth of the saw.

It will be understood, furthermore, by reference to Figs. 4 and 5, that each bar 25 is formed adjacent its inside edge and at opposite ends, with upwardly facing shoulders 30 cut down to a depth somewhat less than the depth to which the surfaces 27 are cut. These four shoulders cooperate for the solid support thereon of a flat filing bar 35.

Overlying the filing bar 35, with its ends seated in the grooves 22—22, is a clamp bar 40, having a clamp screw bolt 41 threaded downwardly therethrough to engage centrally with and press the filing bar 35 against its supporting seats. Loosening of the bolt 41 permits removal of the clamp bar and filing bar from the block.

It will be observed, in Figs. 2 and 3, that wear plates 42 are fixed on the base wall of the channel 2, along opposite end portions of the channel to protect this surface. The bottom surfaces of these plates are flat and are in a horizontal plane that is slightly higher than the bottom filing surface of the bar 35.

In Fig. 4, I have illustrated, in cross section, a form of clamp bar whereby the chain saw to be sharpened may be held in proper position for and during the sharpening operation, and I have also shown in cross section, the saw chain as held in the clamp. In this view, 50 designates one of the rows of those links that are centrally aligned in the chain, and 51 and 52 respectively designate links at opposite sides of the centrally aligned links and pivotally joining the latter.

It is to be understood that the central line of links comprises the teeth 50a of one definite length, while the opposite side links 51 and 52 comprise the teeth 51a and 52a of a shorter length, and it is for use in bringing all teeth of each group to the same length that the present tool or gauge has been designed.

In preparation for gauging the teeth of a saw chain, a certain length of the chain is applied to the clamp. The clamp comprises a rigid side member 56 forming one side of the clamp, and an opposite clamp member 57 affixed to the side 56 by bolts 58 and clamp nuts 59. The top edge surfaces of the two bars 56 and 57 are flat and perfectly straight and when the length of chain is applied thereto, with the guide lugs 50x of the center line of links in place between the clamping members, as shown in Fig. 4, and the side links engaged against the top edge surface of the clamp members, all teeth will be brought to a desired alignment and it is only necessary then that the points of the teeth be cut down to bring them to an exact and uniform length. In the accomplishing of this, the gauge and the clamp bar operate as a combination.

Assuming that the saw chain has been applied to the holding clamp as illustrated in Fig. 4, the gauging tool, equipped with the filing bar 35, as in Fig. 2, is first applied. The exact length to which it is desired to gauge the teeth of the center line of links is determined by an adjustment of the base flanges of the angle bars 3 and 3' from or toward the base of the block 1. This adjustment is accomplished through the adjustment of the wedge blocks 10 and the tightening of the clamp nuts 12 downwardly against the cross bars which determine the position of the two angle bars 3 and 3' and incidentally determine the position of the filing bar 35 relative thereto. The base flanges of the angle bars ride upon the clamp bars and thus guide the gauge in its use.

After this above adjustment has been made, then the block 1 is moved back and forth lengthwise of the chain so that the filing bar 35 will take off the ends of all extending teeth to bring them down to a common uniform length. After the teeth of the central row of links have thus been brought to uniform length, the clamp bar 40 and the filing bar 35 are removed so that the cross channel of the block is clear, as shown in Fig. 5. Then the block is moved as required to locate the cross channel in alignment with a selected tooth of the shorter length and a flat file, as indicated in dotted lines in Fig. 5, is placed across the top surfaces 27 of the gauge bars 25, and the tooth is filed down to the level of the plane of the surfaces 27. Each of the teeth of shorter length is similarly operated on and in this way, all will be brought to the common uniform length. When one section of chain has been gauged, the clamp bolts are loosened and the chain is shifted to bring another section into place for gauging.

Tools of this character may be made in suitable sizes and of materials suitable for the work at hand. They are relatively inexpensive, but provide for the accurate gauging and filing of teeth of the two different lengths with accuracy and in a minimum time.

Having thus described my invention, what I claim as new therein and desire to secure by Letters Patent is—

1. A saw filing gauge for saws of the character described comprising a body block having a flat bottom surface formed with a longitudinal, downwardly opening channel from end to end of the block, and formed with a transverse recess in the top of the block intermediate its ends, and passing through the said longitudinal channel; opposite side walls of the recess having horizontal slots therein, and the bottom of the recess having longitudinally spaced shouldered surfaces at opposite sides of the longitudinal channel, and file guiding surfaces between the said shouldered surfaces at a lower level; a saw filing bar disposed longitudinally of the channel and upon said shouldered surfaces for the filing of saw teeth of one length, a clamp bar overlying the filing bar with its ends contained in the said horizontal slots and a clamp screw through the clamp bar adapted to be tightened against the filing bar to hold it in place, and to be loosened for removal of the clamping bar and filing bar, to give access to the file guiding surfaces for the filing of saw teeth of another length.

2. A gauge as in claim 1 wherein gauge bars are disposed lengthwise of the body block at opposite sides of the longitudinal channel, and means is provided for mounting the bars and whereby they may be adjusted from and toward the base surface of the block.

3. A gauge as in claim 1 wherein gauge bars are disposed lengthwise of the body block at opposite sides of the longitudinal channel, and means is provided for mounting them and whereby they may be adjusted from and toward the base surface of the block; said bars having longitudinal vertical flanges within the longitudinal channel, spaced for the passing of the saw being filed between them.

4. A gauge as in claim 1 wherein angle bars are disposed lengthwise of the body block, at the under side and along opposite sides of the said longitudinal channel; said bars having base flanges lying in the same horizontal plane and adapted for sliding contact with the straight edge of a saw holding clamp, and having vertical flanges disposed in spaced relation in the longitudinal channel for receiving the saw between them; said bars having supports at their ends slidable in said block and adjustable to move the bars toward or from the base of the block.

5. In combination, a saw holding means comprising complemental clamping bars for holding a saw between them in position for filing and forming a straight edge, and a saw filing gauge comprising a body block formed with a flat bottom surface for sliding contact with said straight edge and having a longitudinal, downwardly opening channel therein, and there being a transverse recess in the top portion of the block opening through said channel, guide bars mounted on the block and overlying the base surface at opposite sides of the longitudinal channel and having mounting means whereby the bars are adjustable from and toward the base of the block, bars fixed flatly in the base of the transverse recess at opposite sides of the longitudinal channel and each providing, at its ends, upwardly facing shoulders for the support of a filing bar, and a lower file guiding surface between said shoulders, a filing bar disposed on said shoulders for the filing of saw teeth of one length, a clamp bar across the recess, and a clamp screw through the bar adapted to be tightened against the filing bar to hold it in place, or to be loosened for removal of the clamp bar and filing bar for the support of a file on the said file guiding surfaces for filing teeth of a shorter length.

ANDREW OLSON.